(12) United States Patent
Cartwright et al.

(10) Patent No.: US 6,550,259 B2
(45) Date of Patent: Apr. 22, 2003

(54) CHILLER CONTROL SYSTEM

(75) Inventors: Richard W. Cartwright, Piqua, OH (US); Carl St-Laurent, St-Bonaventure (CA); David Charles Edelmann, Troy, OH (US); Stephen R. Willoughby, Dayton, OH (US); John Joseph Everhart, Springfield, OH (US); Brett J. Beaty, West Milton, OH (US)

(73) Assignee: Premark FEG L.L.C., Wilmington, DE (US)

( * ) Notice: Subject to any disclaimer, the term of this patent is extended or adjusted under 35 U.S.C. 154(b) by 151 days.

(21) Appl. No.: 09/747,900

(22) Filed: Dec. 22, 2000

(65) Prior Publication Data

US 2002/0116936 A1 Aug. 29, 2002

(51) Int. Cl.[7] .............................................. F25B 49/02
(52) U.S. Cl. .............................. 62/126; 62/157; 62/162
(58) Field of Search ........................ 62/125, 126, 127, 62/129, 130, 157, 158, 161, 162, 163, 164, 231

(56) References Cited

U.S. PATENT DOCUMENTS

| | | | |
|---|---|---|---|
| 2,110,192 A | 3/1938 | Bellamy | |
| 4,003,728 A | 1/1977 | Rath | |
| 4,021,213 A | 5/1977 | Neidhardt et al. | |
| 4,298,947 A | 11/1981 | Tamura et al. | |
| 4,358,932 A | * 11/1982 | Helfrich, Jr. | ................. 62/126 |
| 4,368,622 A | * 1/1983 | Brooks | ........................ 62/157 |
| 4,372,099 A | 2/1983 | Linville | |
| 4,389,854 A | * 6/1983 | Ogita et al. | ............... 62/163 X |
| 4,569,204 A | 2/1986 | Ott et al. | ....................... 62/63 |
| 4,621,502 A | 11/1986 | Ibrahim et al. | ............... 62/223 |
| 4,627,742 A | 12/1986 | Sakamoto et al. | .......... 374/109 |
| 4,646,536 A | * 3/1987 | Yamada et al. | ............ 62/157 X |
| 4,697,429 A | 10/1987 | Chandler et al. | ............. 62/203 |
| 4,757,691 A | 7/1988 | Compagnon | ................... 62/63 |
| 4,788,827 A | 12/1988 | Otani | ......................... 62/126 |
| 4,882,851 A | 11/1989 | Wennerstrum et al. | ........ 34/60 |
| 5,249,863 A | 10/1993 | Brown | ........................ 374/102 |
| 5,262,758 A | 11/1993 | Nam et al. | ................... 340/588 |
| 5,284,024 A | 2/1994 | Hanson et al. | ................ 62/126 |
| 5,377,622 A | 1/1995 | Lauttenbach et al. | ....... 119/200 |
| 5,404,935 A | 4/1995 | Liebermann | ............... 165/48.1 |
| 5,421,246 A | 6/1995 | Tippmann et al. | ............ 99/448 |
| 5,460,006 A | 10/1995 | Torimitsu | ..................... 62/127 |
| 5,826,432 A | 10/1998 | Ledbetter | ....................... 62/62 |
| 5,893,270 A | 4/1999 | Arph | ............................. 62/65 |
| 5,902,618 A | 5/1999 | Haasis, Jr. | .................. 426/113 |
| 6,000,845 A | 12/1999 | Tymkewicz et al. | ........ 374/155 |
| 6,056,985 A | 5/2000 | Fluckiger et al. | ........... 426/392 |

FOREIGN PATENT DOCUMENTS

| | | |
|---|---|---|
| JP | 1302089 A | 12/1989 |
| JP | 5149670 A | 6/1993 |
| JP | 08113493 | 5/1996 |

OTHER PUBLICATIONS

Hobart Corp. HQC45 Quickchill & HQCF45 Quickchill Freezer Instructions (Form 34374 (9–99)).

\* cited by examiner

Primary Examiner—Harry B. Tanner
(74) Attorney, Agent, or Firm—Thompson Hine LLP

(57) ABSTRACT

A chiller includes a chilling compartment for receiving food products to be chilled and a chilling system for delivering chilled air to the chilling compartment during chilling operations. A controller effects operation of the chilling system and includes associated memory storing a plurality of food product data entries. Each food product data entry includes a food product name and at least one associated chilling operation setting for the food product. A user input device is associated with the controller. The controller is operable in conjunction with the user input device to permit a user to select a particular food product data entry such that the controller retrieves at least one chilling operation setting of the particular food product data entry for use in a subsequent chilling operation. The chiller may also include a label printing mechanism for printing chilling operation summary labels which can be applied to food product containers.

41 Claims, 4 Drawing Sheets

CHILLER CONTROL SYSTEM

FIELD OF THE INVENTION

The present invention relates generally to commercial food chilling equipment and, more particularly, to chillers having features for facilitating set-up and operation of a chilling operation and improved tracking of chilled food products.

BACKGROUND OF THE INVENTION

Commercial food product chillers, commonly referred to as blast chillers, are typically used to chill hot food products to a safe temperature for storage. For example, a hoot food product at 145° F. to 160° F. or more may be taken just out of the oven, placed in the chiller, and rapidly cooled to a low temperature of 40° F. or less. Such rapid chilling of the food product is desirable for a variety of reasons, including food safety.

Known food product chillers generally operate in one of two modes, namely a chill by temperature mode or a chill by time mode. In the chill by temperature mode a temperature probe is placed in the food product and the desired chilled temperature of the food product can be entered into the machine by a user. The chilling operation then runs until the temperature probe indicates that the food product has reached the desired chilled temperature. In the chill by time mode, a user simply enters a time period for chilling the food product and the chilling operation then runs for the entered time period. In either type of chilling operation a user may also set the type of chill (hard or soft), and/or a desired air temperature within the chilling compartment. Some chillers are also configured to operate in a freeze mode for freezing food products. As used herein the term "chiller" broadly encompasses both units which include a freeze mode and units which do not include a freeze mode.

Known food product chillers are limited in that once set, the food product chiller can only run on the current settings unless a user enters any new settings which may be required for a different food product. In some environments this requires the user to know the proper settings for a large number of food products. While such a requirement may not present a problem for experienced personnel, as users become less experienced and less skilled, difficulties can arise. Further, with less skilled users, and even with skilled users, there is always the possibility that settings may be entered incorrectly.

Appropriate tracking of chilled food products in commercial settings can also be difficult. In many cases it is desirable to know that a given food product has been chilled properly. Known chillers have included a printer for printing a paper ticket for the chilling operation, and users have attempted to tape such tickets to chilled food product containers, but the tickets often fall off of the containers.

Accordingly, it would be desirable to provide a chiller configured to facilitate operation by unskilled users, and it would be desirable to provide a chiller which facilitates tracking of chilled food products.

SUMMARY OF THE INVENTION

In one aspect of the present invention, a chiller includes a chilling compartment for receiving food products to be chilled and a chilling system for delivering chilled air to the chilling compartment during chilling operations. A controller effects operation of the chilling system and includes associated memory storing a plurality of food product data entries. Each food product data entry includes a food product name and at least one associated chilling operation setting for the food product. A user input device is associated with the controller. The controller is operable in conjunction with the user input device to permit a user to select a particular food product data entry such that the controller retrieves at least one chilling operation setting of the particular food product data entry for use in a subsequent chilling operation.

In another aspect of the invention, in a chiller including a controller and associated display device and user input device, a method of setting up a chilling operation for a given food product involves displaying multiple food product identifiers via the display device; selecting, via the user input device, the given food product based upon display of its identifier; and retrieving from memory, via the controller, at least one chilling operation setting for the given food product for use in a subsequent chilling operation of the food product.

Still another aspect of the invention provides a method for tracking compliance of a given food product with established requirements associated with chilling the given food product. The method involves providing a chiller including a controller and a printing mechanism having an associated supply of adhesive labels; monitoring a plurality chilling parameters of a chilling operation of the given food product; and printing a chilling operation summary label which can be applied to the food product, the chilling operation summary label including multiple chilling parameters which were monitored.

DETAILED DESCRIPTION OF THE EMBODIMENTS

Figure 1:
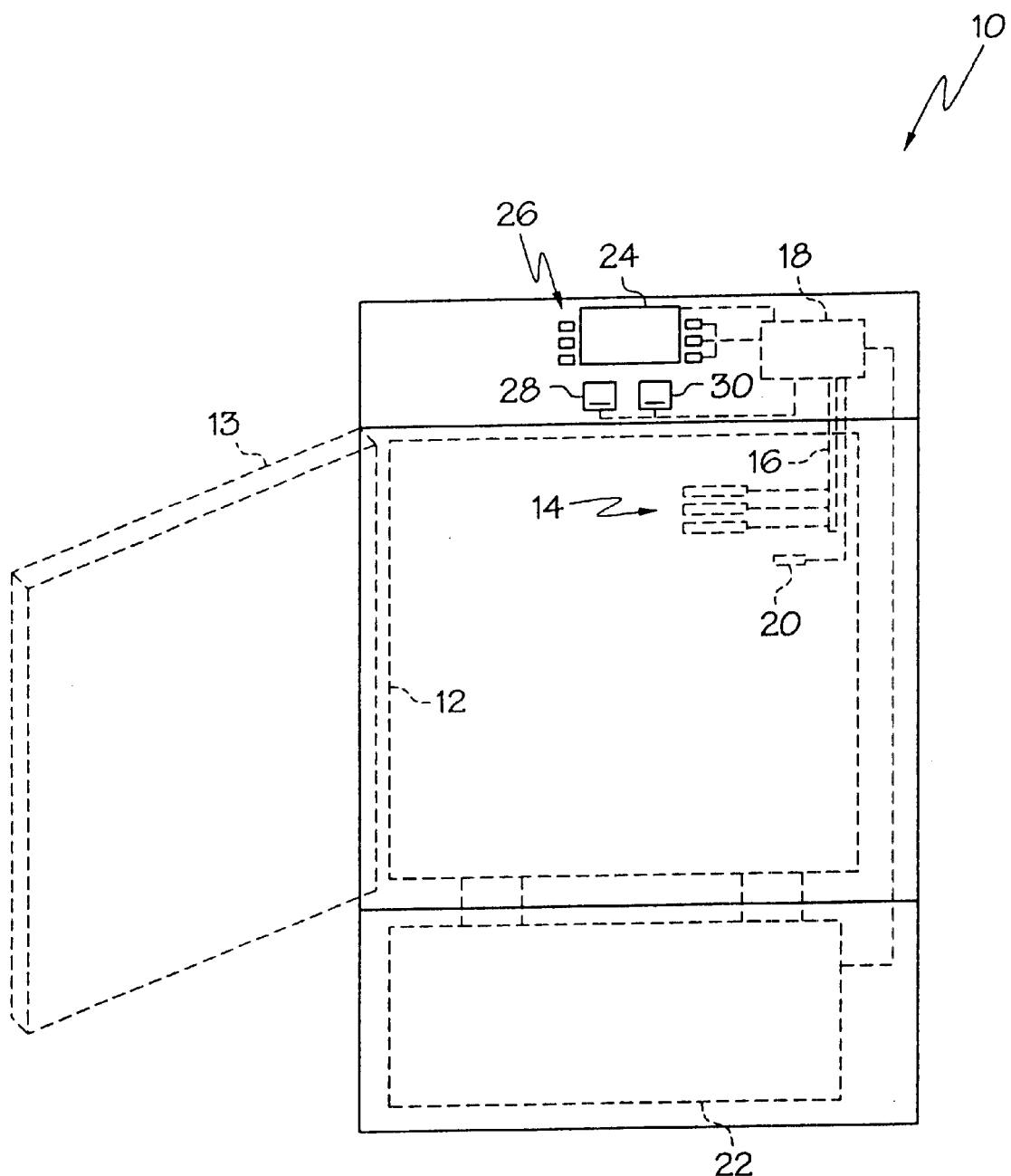
FIG. 1 is a schematic depiction of one embodiment of a chiller.

Referring to drawing FIG. 1, a schematic depiction of a chiller 10 according to one embodiment of the present invention is shown. The chiller 10 includes a chilling compartment 12 which may include multiple racks or shelves (not shown) for receiving food products to be chilled, the compartment typically defined by an insulated housing having an associated door 13 movable between open and closed positions. A plurality of temperature probes 14 are positionable in the chilling compartment 12 for insertion into food products placed in the chilling compartment 12. The probes 14 may be connected to a common wiring harness 16 which extends to a controller 18. The probes 14 output temperature indicative signals to the controller 18. An air temperature sensor 20 is also provided for sensing the temperature of air in the chilling compartment 12 and producing a temperature indicative signal which is delivered to the controller 18. A chilling system 22, operated by the controller 18, generates chilled air which is delivered to the chilling compartment 12 during chilling operations. The chilled air may be circulated through the chilling compartment and back to the chilling system using one or more fans or blowers (see FIG. 2).

The controller 18 is also connected to a display device 24, such as an LCD screen or VF display, for effecting display of information to a user. A user input device 26 is provided for allowing a user to input information to the controller 18. In one embodiment the user input device 26 may be a series of input keys or buttons along the sides of the display device 24 which allow a user to initiate actions or enter information according to information displayed on a portion of the display device 24 alongside the keys. Other user input devices could be used. For example, the user input device could be combined with the display device in the form of a touch screen display, or an alphanumeric data entry key array could be provided.

The chiller includes a label printing mechanism 28 having an associated supply of adhesive label stock. The controller 18 is connected for effecting printing of labels by the printing mechanism 28. A ticket printing mechanism 30 having an associated supply of non-label print stock is also provided, with the controller 18 connected to effect printing of tickets by the printing mechanism 30. In one embodiment, the printing mechanisms may be formed by thermal print heads.

Figure 2:
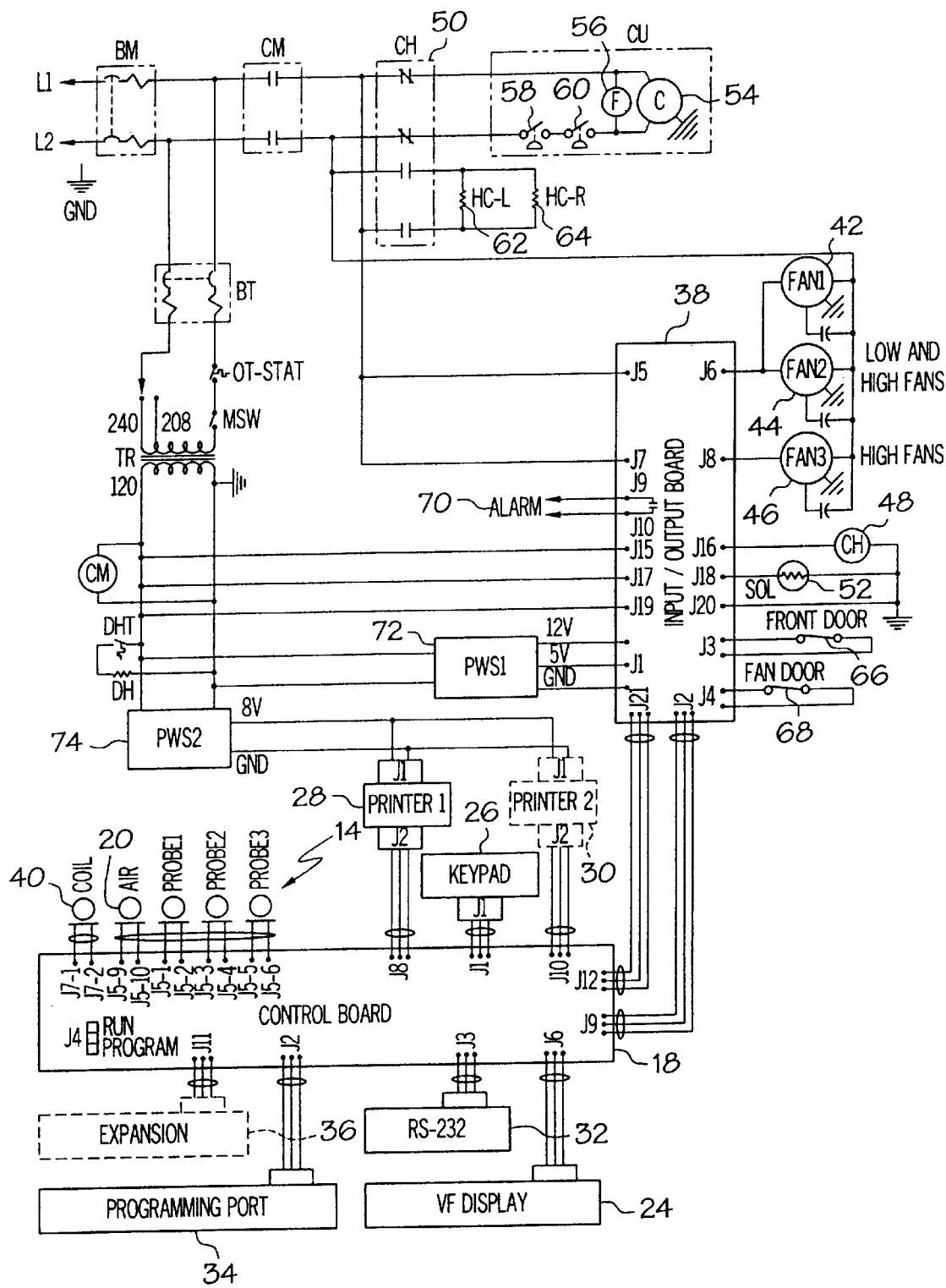
FIG. 2 is a wiring schematic of the chiller of FIG. 1.

Referring now to FIG. 2, a schematic diagram of chiller wiring is shown. The controller 18 may include an RS-232 communications interface 32, a programming interface 34, and an expansion interface 36. The programming interface 34 may be used to reprogram the controller 18. In the illustrated embodiment the controller 18 is connected directly to certain components and indirectly, through input/output board 38, to others. The controller is directly connected to each of the temperature probes 14, the air temperature sensor 20, the user input device 26, the display device 24, and the printing mechanisms 28 and 30. The controller is also directly connected to an evaporator coil temperature sensor 40 which may be used in defrost operations of the coil.

The controller 18 is connected through input/output board 38 to fans 42, 44 and 46 for controlling the flow of chilling air through the chilling compartment. In a hard chilling operation all fans are typically operated for the entire chilling operation while in a soft chilling operation all fans may be operated until the temperature of the food product is lowered to a certain temperature and then air flow may be reduced by turning off one of the fans. The controller 18 is connected through input/output board 38 to the coil portion 48 of the coil heater relay CH which effects contactor portion 50. The controller 18 is also connected through the input/output board 38 to solenoid 52 which is connected in line with the chilling system 22 to control the flow of the refrigerant fluid. Because operation of the compressor motor 54 and fan 56 of the chilling system 22 is responsive to high and low pressure switches 58 and 60, the chilling system can be controlled via control of the solenoid 52. Left and right heater elements 62 and 64 are provided for defrosting.

A front door switch 66 and fan door switch 68 are also connected through input/output board 38 to controller 18 and properly positioned for providing signals indicative of the open/closed state of each of the chilling compartment door 13 and fan compartment door (not shown). Contact, magnetic, optical or other suitable switches could be used. The controller 18 can also effect operation of an alarm 70, such as a beeper, light or other annunciator, through the input/output board 38. Power supplies 72 and 74 are also shown.

The controller 18 includes associated memory (EEPROM, RAM, ROM and/or other memory) for storing operating code and other information. A database formed by a plurality of food product data entries may be stored in memory. Each food product data entry includes a food product name or other identifier and at least one associated chilling operation setting for the food product. For example, Table I below shows a representative food product data entry with numerous chilling operation settings associated with each food product data entry.

TABLE I

Food Product Data Entries

| ID | $TT_C$ | $AT_C$ | $TT_F$ | $AT_F$ | $TP_C$ | $D_C$ | $D_F$ |
|---|---|---|---|---|---|---|---|
| CHICKEN-25 lb | 40 | 28 | 25 | 15 | xx | 75 | 90 |
| CHILI-10 lb | 38 | xx | xx | xx | H | 45 | 60 |

The exemplary settings which may be associated with each food product data entry include a product identifier (ID), a target temperature for a temperature-based chilling operation ($TT_C$), an air temperature for a chilling operation ($AT_C$), a target temperature for a temperature-based freezing operation ($TT_F$), an air temperature for a freezing operation ($AT_F$), a chill type indicator ($TP_C$) which may reflect hard chill (H), soft chill, (S) or freeze chill (F), a duration for a time-based chilling operation ($D_C$), and a duration for a time-based freezing operation ($D_F$). Actual values are entered for some parameters while an entry of "xx" represents no data entry for that given parameter. Other chilling operation settings might also be included, such as an entry which identifies what chilling parameters should be monitored during a chilling operation, or specific chilling requirements which may be applicable to given food products. Regardless of the number and type of chilling operation settings provided, the chiller enables a user to identify settings for given food products based upon identification and selection of the food product, and subsequent retrieval of chilling operation settings by the controller 18 for use in a chilling operation which is being set up.

Another exemplary food product data entry format is shown in Table II below.

TABLE II

Food Product Data Entries

| ID | MODE | TARGET | HTEMP |
|---|---|---|---|
| 18 Characters | 1 byte | 1 integer | 1 integer |

In this table the product identifier (ID) may be an 18 character entry; the MODE entry may define chill, soft chill, or freeze and either chill by temperature or chill by time; the TARGET entry may define the target chill temperature for a by temperature chilling operation or the chill duration for a by time chilling operation; the HTEMP entry may define an alarm temperature.

Figures 3A, 3B:
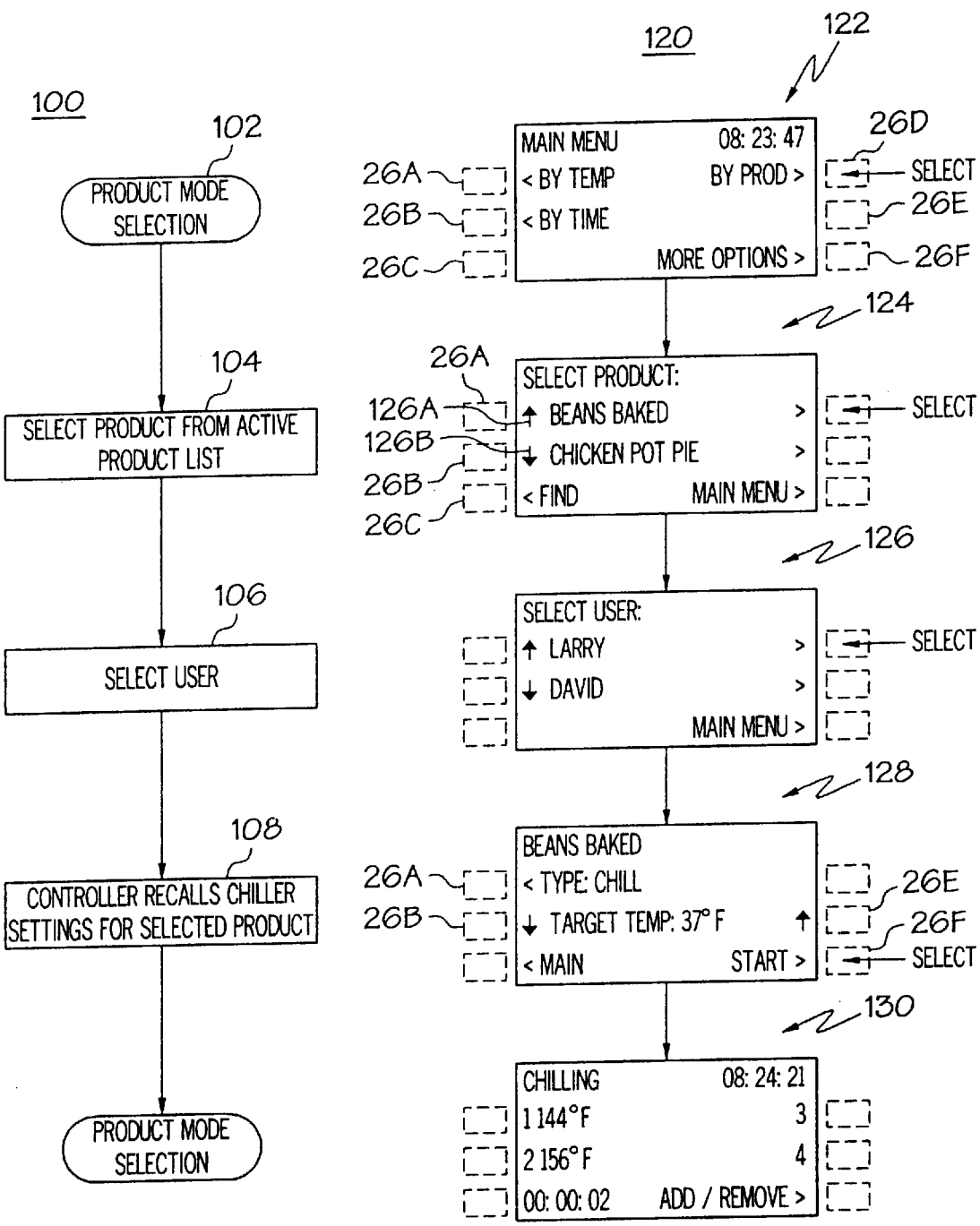
FIG. 3A is a flowchart depicting one embodiment of a chill by product operation.
FIG. 3B shows representative display screens during the chill by product operation.

Referring to the flowchart 100 and exemplary display sequence 120 shown in FIGS. 3A and 3B, use of the stored operation settings to initiate a chilling operation is demonstrated. During a chilling mode selection sequence, the display device 24 displays a chill options screen 122 for the user to select a type of chilling operation, such as chill by temperature ("BY TEMP"), chill by time ("BY TIME") or chill by product ("BY PROD"). In order to take advantage of the food product data entries provided in memory, the user selects chill by product by pressing data entry button 26D to the right of the display of BY PROD as indicated at step 102. The controller 18 then operates in conjunction with the display device 24 to display a select product display screen 124 in which product names or other product identifiers are displayed for those products which are active, where data entries for those products which are active are available to be used. Where the display device 24 is only capable of displaying a limited number of food product names, either button 26A or 26B, associated with up and down arrows 126A and 126B, may be pushed to cause a scroll up or down operation (according to alphabetical position) so that other food product names are displayed. When the food product name for the food product to be chilled is displayed, the user then presses the corresponding, aligned button 26 on the right hand side of the display screen to select the product as indicated at step 104. The controller 18 then retrieves from memory one or more operation settings from the food product data entry associated with the selected food product name so that the settings can be used in the subsequent chilling operation.

After selecting the desired food product per the above, the controller 18 may be configured to permit a user to identify himself from a list of possible users which is stored in memory. A user select display screen 126 providing this function is shown, and a user can scroll through the list using the left hand side up and down arrow buttons 26A and 26B, and then select the appropriate user by name using the right hand side buttons 26D or 26E.

Once the user is selected per step 106, the controller 18 operates with the display device 24 to display a chilling operation settings screen 128 for review by the user, where one or more of the retrieved operation settings is displayed as indicated by step 108. In the illustrated screen 128 the product name, chill type, and target temperature are displayed, but it is recognized that more, less or other chilling operation settings could be displayed. If the displayed settings are satisfactory, the user presses button 26F (associated with the START display) to start the chilling operation using the retrieved settings. If for some reason a user wishes to vary from the retrieved chilling operation settings, changes can be made prior to starting the chilling operation. For example, in the illustrated embodiment the chill type could be varied by pressing button 26A, or the target temperature could be varied down or up by pressing buttons 26B or 26E. Once the chilling operation is started, the controller 18 may operate with the display device 24 to display a number of real time chilling operation parameters, such as the running duration of the chilling operation, and the temperature as sensed by one or more probes, as shown in display screen 130.

It is recognized that functions such as user identification and varying of the retrieved chilling parameter settings could be eliminated, in which case the controller 18 could immediately start the chilling operation in response to selection of a food product and subsequent retrieval of one or more chilling operation settings. Where a food product data entry includes information relating to both chilling by time and chilling by temperature, the controller 18 could prompt the user, via the display device 24, to identify which chilling parameters need to be retrieved.

Referring again to select product display screen 124, an improved product find functionality can be initiated using button 26C adjacent the FIND display line. Once pressed, the controller 18 initiates a product find mode. In the product find mode, the first letter of the displayed product name begins flashing and the user can press an up arrow button or down arrow button to move to a product name associated with the next letter. Once the proper first letter is identified, the user presses a next letter button and the second letter of the displayed product name begins flashing. The user can then again use right or left arrow buttons etc. In this manner a user can quickly move to the appropriate product name without having to scroll through every product. For example, where the food product names include ten products beginning with the letter C and the user wishes to move from display of a product beginning with the letter B to a product beginning with the letter D, three button presses will bring the display to food products beginning with the letter D rather than the ten it would take to completely scroll through all product names beginning with the letter C.

As mentioned above, product names or other product identifiers may be displayed for those products which are active to allow the user to select the appropriate food product data entry. In this regard, the chiller may include functionality for enabling the activation/deactivation of the multiple food product data entries. For example, in an environment where only five different food products will ever be chilled, it will often make sense to limit the displayed food product names to those five food products for convenience. Therefore, in a food product activation mode of the chiller the functionality for achieving activation/deactivation of food product data entries may operate by displaying all food product names and allowing the user to press an activate button or deactivate button as the food product name is displayed. It may be preferred that the food product activation mode be only initiated by a master user, in which case a requirement may be made for entering a password before entering the food product activation mode. A data entry modification mode may also be provided for allowing the user to modify data entries via the user input device 26. New data entries may be entered by the user in such mode. Either communication port 32 or 34 could also be used to activate/deactivate data entries or modify data entries.

Once a chilling operation is underway, the controller 18 may monitor various ongoing chilling operation parameters such as cycle date, cycle start time, cycle duration, durations to achieve certain temperatures, and what temperature probe is used. At the conclusion of the chilling cycle the user may effect printing of a chilling operation summary label by printer 28, which label may then be attached to the food product container for tracking the food product. Where multiple food product containers are used, multiple labels may be printed. Unlike prior systems in which tickets which were taped to food product containers, the summary labels are more convenient and are less likely to fall off and be lost. In the illustrated embodiment the summary label printing functionality may be implemented by displaying on the display device 24 a summary label option which the user can select by pressing the button 26 aligned therewith.

Figure 4:
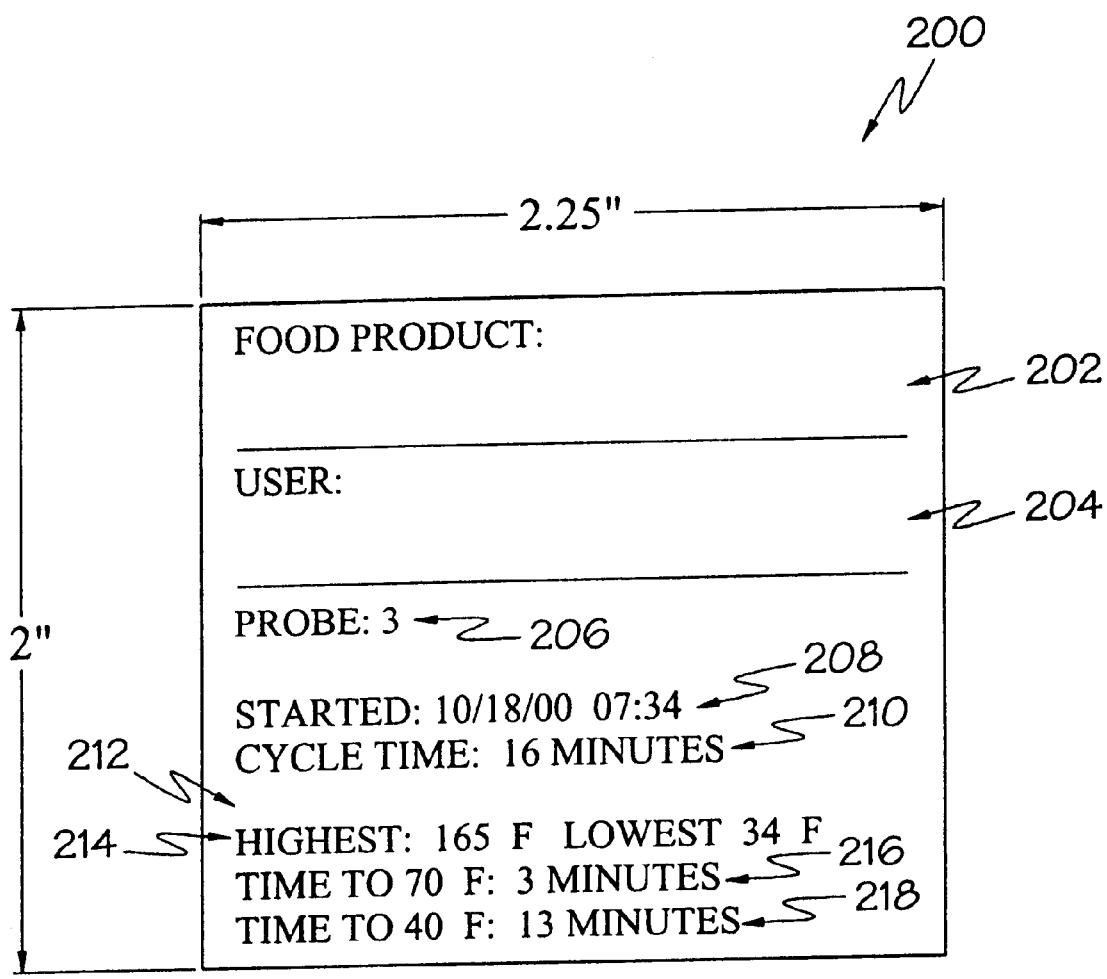
FIG. 4 depicts an exemplary chilling operation summary label.

An exemplary summary label 200 is shown in FIG. 4. Where the controller 18 is not tracking the food product name or the user, spaces 202 and 204 may be left to allow a user to write in such information. Otherwise, if the food product name and user information is tracked, such information may be printed automatically. The illustrated label 200 includes a probe identifier 206, a cycle start time and date 208, a cycle duration 210, a highest food product temperature 212 over the cycle, a lowest food product temperature 214 over the cycle, a time 216 taken to chill the food product to a first intermediate temperature (such as 70° F.), and a time 218 taken to chill the food product to a second intermediate temperature (such as 40° F.). As few or as many parameters of the chilling operation may be included on the summary label as desired. Further, a bar code could be printed on the label to further improve food product tracking. Where requirements for chilling given food products are known and stored in memory of the controller 18 in advance, the controller 18 could be operable to verify whether the requirements were met, and to print a requirements met/not met identifier on the label 200.

The printer 30 may be used to print a chilling operation summary ticket which can be placed in a permanent file if desired. The information included on the ticket may be the same as or different from that printed on the chilling operation summary label 200.

Although the invention has been described and illustrated in detail it is to be clearly understood that the same is intended by way of illustration and example only and is not intended to be taken by way of limitation.

Accordingly, the spirit and scope of the invention are to be limited only by the terms of the appended claims.

What is claimed is:

1. A chiller, comprising:
   a chilling compartment for receiving food products to be chilled;
   a chilling system for delivering chilled air to the chilling compartment during chilling operations;
   a controller for effecting operation of the chilling system, the controller including associated memory storing a plurality of food product data entries, each food product data entry including a food product name and at least one associated chilling operation setting for the food product;
   a user input device associated with the controller;
   wherein the controller is operable in conjunction with the user input device to permit a user to select a particular food product data entry such that the controller retrieves at least one chilling operation setting of the particular food product data entry for use in a subsequent chilling operation.

2. The chiller of claim 1, further comprising:
   a display device associated with the controller for displaying information;
   wherein the controller is operable with the display device to display names of food products associated with the food product data entries, and the controller is operable in conjunction with the user input device to permit a user to select a food product data entry associated with a displayed name, the chiller operable retrieve the at least one chilling operation setting based upon such user selection.

3. The chiller of claim 2 wherein the controller is operable with the display device and the user input device to permit a user to scroll through a list of food product names associated with the plurality of food product data entries.

4. The chiller of claim 2 wherein, when in a find product mode, the controller is operable with the display device and the user input device to permit a user to search through product names one character at a time.

5. The chiller of claim 1 wherein the retrieved chilling operation setting comprises a target temperature to which the food product is to be chilled.

6. The chiller of claim 5 wherein a chilling air temperature is also retrieved as a chilling operation setting.

7. The chiller of claim 5 wherein a chill type is also retrieved as a chilling operation setting.

8. The chiller of claim 1 wherein the retrieved chilling operation setting comprises a chill duration for the food product.

9. The chiller of claim 8 wherein a chilling air temperature is also retrieved as a chilling operation setting.

10. The chiller of claim 8 wherein a chill type is also retrieved as a chilling operation setting.

11. The chiller of claim 1 wherein the controller is further operable in conjunction with the display device and the user input device to display a list of chiller users, stored in memory, and to permit a user to select one of the users, wherein the controller associates the selected user with the subsequent chilling operation.

12. The chiller of claim 11, further comprising a printing mechanism and associated supply of labels, the controller operable for controlling the printing mechanism, wherein the controller is operable to effect printing of a chilling operation summary label by the printing mechanism.

13. The chiller of claim 12 wherein a time taken to chill the food product to a first intermediate temperature is printed on the chilling operation summary label.

14. The chiller of claim 12 wherein a time taken to chill the food product to a second intermediate temperature is printed on the chilling operation summary label.

15. The chiller of claim 12 wherein the controller is operable with the user input device and the printing mechanism to permit the user to print multiple chilling operation summary labels for a given chilling operation.

16. The chiller of claim 12, further comprising a second printing mechanism and associated supply of non-label print stock, the controller operable for controlling the second printing mechanism, wherein the controller is operable to effect printing of a chilling operation summary ticket by the second printing mechanism.

17. The chiller of claim 1, further comprising an external interface associated with the controller for downloading food product data entries into memory.

18. The chiller of claim 2 wherein the controller is operable in conjunction with the user input device and the display device to permit a user to modify food product data entries.

19. The chiller of claim 2 wherein the controller is operable in conjunction with the user input device and the display device to permit a user to create a new food product data entry for storage in memory.

20. The chiller of claim 1 wherein the user input device comprises multiple keypad buttons.

21. The chiller of claim 1 wherein the user input device comprises an alphanumeric keypad.

22. The chiller of claim 2 wherein the controller is operable to effect display of names of food products associated with the food product data entries in response to a user initiating a chill by product mode of the chiller via the user input device.

23. The chiller of claim 1 wherein the controller is operable with the user input device to permit a master user to set an active/inactive state of each food product data entry, wherein the controller is operable to only permit a user to select a food product data entry which is active.

24. In a chiller including a controller and associated display device and user input device, a method of setting up a chilling operation for a given food product, the method comprising the steps of:
   (a) displaying multiple food product identifiers via the display device;
   (b) selecting, via the user input device, the given food product based upon display of its identifier;
   (c) retrieving from memory, via the controller, at least one chilling operation setting for the given food product for use in a subsequent chilling operation of the food product.

25. The method of claim 24 wherein step (a) is triggered via a step in which the user input device is used to initiate a chill by product mode of the chiller.

26. The method of claim 24 wherein the retrieved chilling operation setting comprises a target chill temperature for the food product.

27. The method of claim 26 wherein, in addition to the target chill temperature, a chill type chilling operation setting is also retrieved from memory.

28. The method of claim 27, comprising a further step of displaying, on the display device, each of the product identifier, the target chill temperature, and the chill type once retrieved, and a chilling operation utilizing the target chill temperature and the chill type is subsequently initiated via the user input device.

29. The method of claim 26 wherein, in addition to the target chill temperature, an air temperature chilling operation setting is also retrieved from memory.

30. The method of claim 24 wherein the retrieved chilling operation setting comprises a chill duration for the food product.

31. The method of claim 24, wherein step (a) involves using the user input device to scroll the display of product identifiers until the product identifier for the given product is found.

32. The method of claim 24 comprising the further steps of:
displaying multiple user names;
using the user input device to select a user name when displayed; and
associating the selected user name with the chilling operation being set up.

33. The method of claim 24 wherein in step (a) the multiple food product identifiers are displayed simultaneously.

34. In a chiller including a controller and associated memory and a user input device, a method of chilling a given food product, the method comprising the steps of:
(a) storing in memory a plurality of food product data entries, each food product data entry including an associated food product identifier and at least one associated chilling operation setting for the food product;
(b) selecting, via the user input device, a food product data entry for the given food product;
(c) retrieving from memory, via the controller, at least one chilling operation setting for the given food product for use in a subsequent chilling operation of the food product.

35. The method of claim 34 wherein step (a) involves:
(i) displaying multiple food product identifiers via a display device;
(ii) selecting, via the user input device, the given food product when identifier is displayed.

36. A chiller, comprising:
a chilling compartment for receiving food products to be chilled;
a chilling system for delivering chilled air to the chilling compartment during chilling operations;
a controller for effecting operation of the chilling system,
a first printing mechanism and associated supply of adhesive labels, the controller operable for controlling the printing mechanism, wherein, upon conclusion of a given chilling operation, the controller is operable to effect printing of a chilling operation summary label by the label printing mechanism.

37. The chiller of claim 36, further comprising:
a second printing mechanism and associated supply of non-label print stock.

38. The chiller of claim 36 wherein the controller is operable for the given chilling operation to store a first time period taken to chill the food product to a first intermediate temperature, a second time period taken to chill the food product to a second intermediate temperature, a date of the chilling operation, a start time of the chilling operation, and a cycle time of the chilling operation, wherein the controller is operable to effect printing of the first time period, second time period, date, start time and cycle time on the chilling operation summary label.

39. The chiller of claim 38 wherein the controller is operable for the given chilling operation to store a user name and a food product identifier for the product being chilled, and the controller is operable to effect printing of the user name and the product identifier on the chilling operation summary label.

40. The chiller of claim 36 wherein the controller is operable for the given chilling operation to store a first time period taken to chill the food product to a first intermediate temperature, and wherein the controller is operable to effect printing of the stored first time period on the chilling operation summary label.

41. The chiller of claim 40 wherein the controller is operable for the given chilling operation to store a second time period taken to chill the food product to a second intermediate temperature, and wherein the controller is operable to effect printing of the stored second time period on the chilling operation summary label.

* * * * *